(12) United States Patent
Svejkovsky et al.

(10) Patent No.: US 6,193,050 B1
(45) Date of Patent: Feb. 27, 2001

(54) IN-LINE CONVEYOR ACCUMULATOR SYSTEM AND METHOD

(75) Inventors: Paul B. Svejkovsky, Coppell; Paul A. Svejkovsky, Marquez, both of TX (US)

(73) Assignee: Svejkovsky Engineering, Marquez, TX (US)

( * ) Notice: Subject to any disclaimer, the term of this patent is extended or adjusted under 35 U.S.C. 154(b) by 0 days.

(21) Appl. No.: 09/235,971

(22) Filed: Jan. 22, 1999

(51) Int. Cl.⁷ .................................................. B65G 1/00
(52) U.S. Cl. .................... 198/347.2; 198/592; 198/600; 198/752.1
(58) Field of Search ................. 198/347.1, 347.2, 198/592, 600, 752.1, 756, 758

(56) References Cited

U.S. PATENT DOCUMENTS

| | | |
|---|---|---|
| 3,353,651 | * 11/1967 | Witmer ............................. 198/347.2 |
| 4,899,669 | * 2/1990 | Dumbaugh ........................... 198/762 |
| 5,211,277 | 5/1993 | Mount . |
| 5,351,807 | 10/1994 | Svejkovsky . |
| 5,746,300 | * 5/1998 | Brizzi et al. ...................... 198/347.2 |
| 5,794,757 | 8/1998 | Svejkovsky et al. . |
| 5,845,758 | * 12/1998 | Bryant et al. ..................... 198/347.1 |

* cited by examiner

Primary Examiner—Christopher P. Ellis
Assistant Examiner—Mark A. Deuble
(74) Attorney, Agent, or Firm—Browning Bushman

(57) ABSTRACT

A conveyor system 10, 60 for transporting goods from upstream equipment to downstream equipment and for temporarily storing goods when the operation of the downstream equipment is temporarily interrupted includes a conveyor tray 12, 62 and a drive mechanism 24 cyclically acting on the conveyor tray to move goods along the tray floor 14. An accumulator ramp 40, 65 includes an inclined ramp floor 46, 66 having a lower end mating with the tray floor and secured thereto to cyclically move with the conveyor tray in response to the drive mechanism. According to the method of the invention, goods are moved along the conveyor tray and are pushed up the accumulator ramp when the operation of the downstream equipment is interrupted.

20 Claims, 2 Drawing Sheets

IN-LINE CONVEYOR ACCUMULATOR SYSTEM AND METHOD

FIELD OF THE INVENTION

The present invention relates to an accumulator for temporarily storing goods moved by a conveyor. More particularly, this invention relates to an in-line conveyor accumulator for temporarily storing goods transported along a cyclically powered conveyor tray.

BACKGROUND OF THE INVENTION

Various types of conveyors have been used for centuries for moving goods. Belt, chain, roller, and screw-type conveyors each have their advantages. In recent years, various industries have increasingly used conveyors having an elongate tray which is cyclically powered by a drive motor to move goods along the tray. One type of conveyor using such a tray is a vibratory conveyor, as disclosed in U.S. Pat. No. 5,211,277. The cycle of a vibratory conveyor tray thrusts the goods forward and upward, then pulls the tray backward while the goods are suspended in the air. The stroke of a vibratory conveyor is generally less than $1/8$th inch, and typically is about $1/16$th inch. A vibratory conveyor has the benefit of simplicity and easy cleaning, since only the conveyor tray contacts the material being conveyed. Accordingly, vibratory conveyors are commonly used in the food processing industry.

Another type of cyclically powered conveyor which benefits from the use of an elongate tray is a linear motion conveyor. In a linear motion conveyor, the drive motor moves the tray forward to convey goods supported on the tray, and then pulls the tray rearward at a faster rate so that the goods slide along the conveyor tray, thereby effectively transporting the goods along the conveyor tray. The stroke of a linear motion conveyor is generally from 1 inch to 2 inches, and typically from $1\frac{1}{2}$ inches to 2 inches. A linear motion conveyor has several significant advantages over a vibratory conveyor, primarily because the tray motion is more gentle on the transported goods. Linear motion conveyors are well suited for transporting fragile goods, such as snack foods, since the goods may be reliably transported along the conveyor tray without being damaged. Since the goods are not thrust upward off the tray supporting surface, seasonings or other particles loosely attached to the goods remain on the goods much better than when using a vibratory conveyor. A linear motion conveyor is disclosed in U.S. Pat. No. 5,351,807.

In many applications, goods being moved along a conveyor tray must be temporarily stored. Upstream processing equipment, for example, continuously produces snack foods, and conveyors conventionally transport these goods to downstream seasoning equipment or bagging equipment. For various reasons, the downstream equipment may be temporarily shut down, e.g., to clean jams or to replace packaging. Since the upstream equipment preferably continues to output goods, a buffer or accumulator system is required to temporarily store goods while operation of the downstream equipment is temporarily discontinued.

Traditional accumulator systems include belt conveyors which are moved under the discharge of the conveyor tray. The belt is slowly powered to transport the goods away from the conveyor tray. Hopefully the operation of the downstream equipment will be resumed before the goods reach the discharge end of the belt conveyor. Once operation of the downstream equipment resumes, the belt conveyor may be reversed to feed the stored goods back into the conventional conveyor system. Belt-type accumulators take up considerable space and are expensive to purchase and maintain. Belt-type conveyors also do not have the advantages of a conveyor which moves goods along a unitary tray, and accordingly sanitation costs are typically quite high.

Another type of accumulator system which has been used with vibratory conveyors may be referred to as an on-demand system. An on-demand system slows down the product travel speed along the conveyor tray to compact the product and thereby gain buffer capacity. This on-demand system typically causes increased damage to the product, in part because the vibrating discharge end of one conveyor may engage built up product accumulated on a downstream conveyor. This type of on-demand system generally cannot be successfully used with a linear motion conveyor because of the much longer stroke length of the linear motion conveyor, which would cause even more damage to the goods. Those skilled in the art appreciate that the product damage caused by approximately $1/16$th inch stroke of the discharge end of an on demand vibratory conveyor might be acceptable for some applications, but that the corresponding product damage caused by the $1\frac{1}{2}$ inch stroke of linear motion conveyor engaging the built-up product would be unacceptable.

Accordingly, an improved accumulator system is required for conveyors, and particularly for conveyors with a cyclically powered tray, such as vibratory and linear motion conveyors. A preferred accumulator system would be relatively inexpensive and would utilize existing conveyor equipment, thereby reducing installation and maintenance costs. A preferred accumulator system also would require little floor space, since floor space in many applications is at a premium, particularly when the accumulator system is installed for an existing conveyor system. Because conveyors which utilize a unitary tray commonly transport fragile products, the accumulator system preferably is also gentle on the goods and results in minimal damage to the accumulated product. In many applications, the transported product itself has a relatively short shelf life, and accordingly the accumulator system preferably is a first in/first out system, so that the goods first added to the accumulator system are the first goods to pass from the accumulator system to downstream equipment.

The disadvantages of the prior art are overcome by the present invention, and an improved in-line conveyor with an accumulator system and method are hereinafter disclosed for temporarily storing products conveyed along a cyclically powered conveyor tray.

SUMMARY OF THE INVENTION

A conveyor system for transporting goods from upstream equipment to downstream equipment includes an accumulator for temporarily storing goods when the operation of the downstream equipment is interrupted. The conveyor system is ideally suited for use with a conveyor of the type having a cyclically powered conveyor tray with a substantially horizontal floor for supporting the goods thereon, and a drive mechanism cyclically acting on the conveyor tray for moving goods along the tray floor. More particularly, the conveyor system of the present invention is ideally suited for use with a linear motion conveyor wherein the tray is moved slowly forward, then the tray is moved more quickly backward to move goods along the conveyor tray. The accumulator system of this invention may also be used with a vibratory conveyor.

The conveyor system includes an accumulator ramp for temporarily storing the goods. The ramp has a ramp floor with a lower end mating with the tray floor and an upper end vertically spaced above the lower end. Goods moving along the conveyor tray are pushed up the accumulator ramp floor. The ramp floor is structurally secured to the conveyor tray to cyclically move with the conveyor tray in response to the drive mechanism. The accumulator ramp also includes ramp sides on opposing sides of the accumulator floor for temporarily accumulating goods on the conveyor ramp.

According to the method of the present invention, the drive mechanism is powered to act on the conveyor tray to move goods along the tray floor and normally transport goods between the upstream equipment and the downstream equipment. If operation of the downstream equipment is temporarily interrupted, the method of the present invention employs an accumulator ramp so that goods moving along the tray are pushed up the accumulator ramp, thereby accumulating goods both on the accumulator ramp and on the conveyor tray. The method of the invention thus uses the force of gravity acting on the goods on the accumulator ramp to provide a back pressure which gently compacts the product along both the accumulator ramp and the conveyor tray.

In one embodiment of the invention, a ramp floor is pivotally connected to the conveyor tray and is movable from a conveyor transport position to an accumulator position by a powered ramp actuator. In another embodiment, a gate is provided normally opened for discharging goods from the conveyor tray, but may be closed by a powered gate actuator to cause goods to move up the accumulator ramp.

It is an object of the present invention to provide an improved conveyor system for transporting goods from upstream equipment to downstream equipment and for temporarily storing goods when operation of the downstream equipment is temporarily interrupted. The system of the present invention utilizes an accumulator ramp for temporarily storing goods, with the ramp being secured to the conveyor tray and being cyclically moved in response to the drive mechanism.

It is another object of the present invention to provide a conveyor system with an accumulator feature wherein the accumulator system is relatively inexpensive and may utilize existing equipment.

The method of the invention includes cyclically powering a conveyor tray to move goods along the tray floor, and pushing the conveyed goods up an inclined accumulator ramp when operation of the downstream equipment is interrupted.

It is a feature of the present invention that the accumulator system may be readily adapted for use with existing conveyor technology, and that the accumulator system requires little additional space.

Yet another feature of the invention is that the accumulator system may be reliably used when the conveyor system is transporting relatively fragile goods. A related feature of the invention is that the accumulator system may provide a first in/first out flow of product from the accumulator system.

Still another feature of the invention is that a depth sensor may be provided for detecting the depth of goods along the conveyor tray, and the control mechanism may be used for acting on the conveyor drive mechanism to slow down the travel rate of goods along the conveyor tray. A position sensor may be used for detecting the position of goods along the ramp floor, and the operation of the drive mechanism may be discontinued when the goods reach a selected position along the ramp floor.

It is an advantage of the present invention that an improved conveyor system is provided for transporting goods and also for temporarily storing goods, with the improved conveyor system having a relatively low cost. A related significant advantage of the invention is that the accumulator system may be used on a conveyor which requires gentle treatment of the transmitted goods.

It is another advantage of the present invention that the accumulator system may be used in conjunction with a cyclically powered conveyor tray used in the food processing industry. The ramp sides may be fixedly secured to the tray. A lip seal may be used for sealing between an edge of the ramp floor and a ramp side.

These and further objects, features and advantages of the present invention will become apparent from the following detailed description, wherein reference is made to the figures in the accompanying drawings.

DETAILED DESCRIPTION OF PREFERRED EMBODIMENTS

Figure 1:
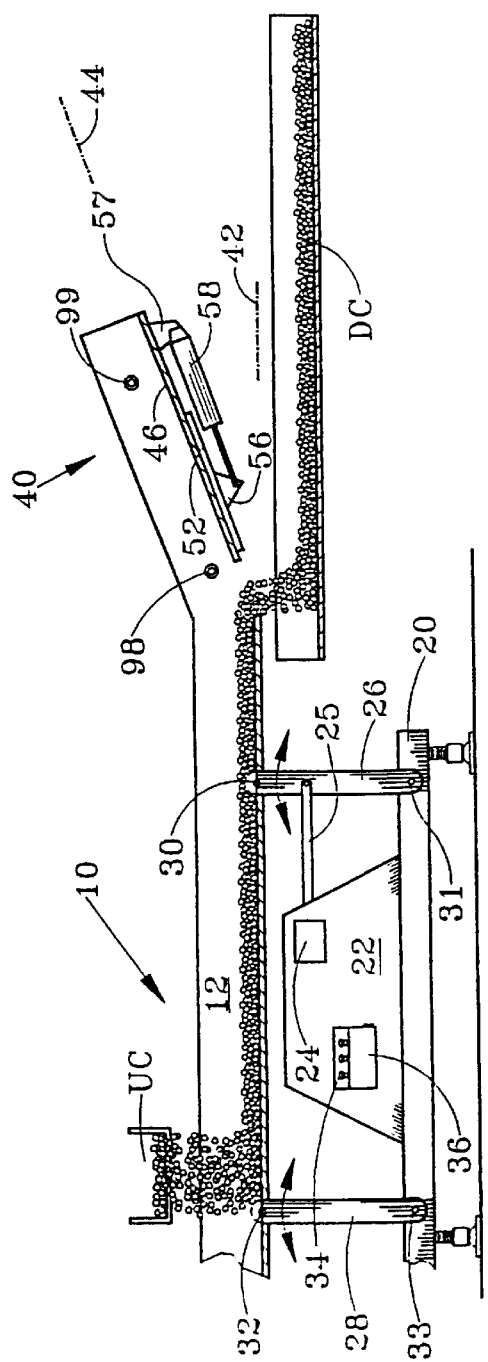
FIG. 1 is a side view, partially in cross-section, of a cyclically powered conveyor system according to the present invention having an opened gate and an inclined accumulator ramp.
Figure 2:
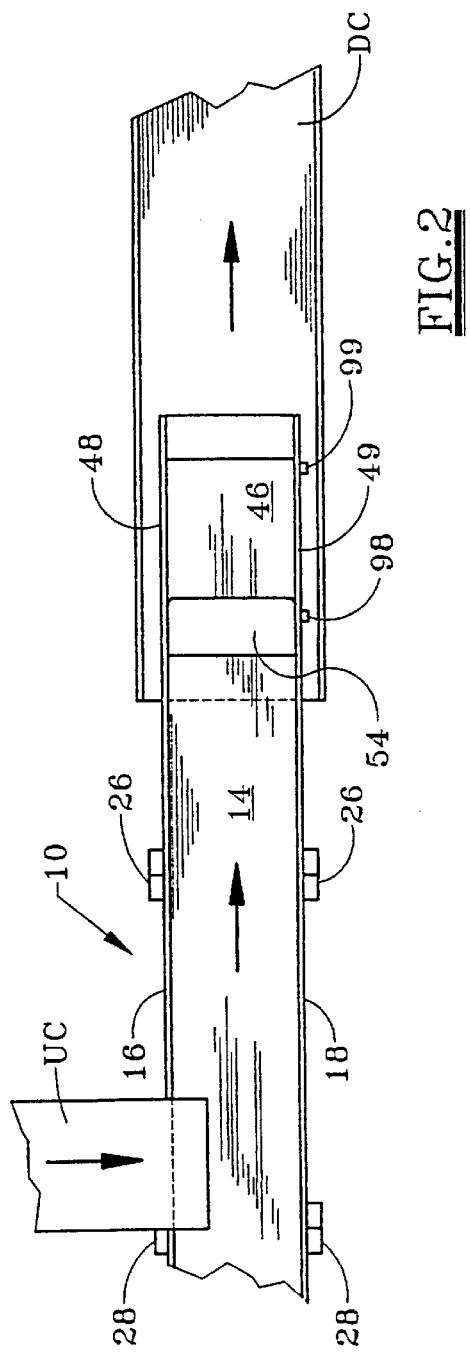
FIG. 2 is a top view of the conveyor as shown in FIG. 1, illustrating the travel of the goods from upstream equipment, which may comprise one or more upstream conveyors, to downstream equipment, which in the illustrated embodiment is a downstream conveyor.

FIG. 1 discloses a conveyor system 10 for transmitting goods from upstream equipment to downstream equipment, and for temporarily storing goods when the operation of the downstream equipment is temporarily interrupted. In the illustrated embodiment, the upstream equipment is an upstream conveyor UC which feeds the conveyor system 10. Although only a single upstream conveyor UC is depicted, those skilled in the art will recognize that multiple conveyors may be used for supplying goods to the conveyor system 10. Also, it should be understood that the upstream equipment need not be a conveyor, and instead may be processing equipment which outputs goods, such as snack foods, to the conveyor system 10. For the embodiment shown in FIG. 1, the downstream equipment is a downstream conveyor DC. In many applications, various conveyor systems 10 may be positioned for sequentially transporting goods from one conveyor system to another conveyor system, and accordingly the downstream conveyor DC may be a conveyor system substantially similar to the system 10 shown in FIG.

1. In other applications, the downstream equipment may be seasoning equipment or bagging equipment of the type commonly used in the snack food industry. The system 10 of the present invention is capable of temporarily storing goods when the operation of downstream equipment is temporarily interrupted, thereby minimizing damage to the transported goods which otherwise would occur during that downstream interruption.

A conveyor system includes a conveyor tray 12 having an elongate substantially horizontal tray floor 14 for transporting the goods longitudinally thereon and tray sides 16, 18 on opposing transverse sides of the tray floor. According to a preferred embodiment of the invention, the conveyor is a linear motion conveyor of the type generally disclosed in U.S. Pat. No. 5,351,807. The conveyor may, however, utilize any type of drive mechanism which cyclically acts on the conveyor tray to move goods along the tray floor, and may be a vibratory conveyor. For the embodiment depicted in FIG. 1, the conveyor system includes a conveyor base 20 and a stationary support 22. A drive mechanism 24 may be an electrically powered motor which cyclically drives a crank arm 25. The conveyor tray 12 may be supported by a plurality of arms 26, 28 each pivotally connected at 31, 33, respectively, to a lower end to the base 20. Each arm 26, 28 is also pivotally connected at 30, 32 to a respective one of the tray sides. Accordingly, the drive mechanism 24 acts on the conveyor tray to move goods along the tray floor 14. Further details with respect to a suitable drive mechanism for a linear motion conveyor are disclosed in U.S. Pat. No. 5,794,757. A plurality of manually operated controls at control pad 34 may be used for controlling the operation of the drive motor 24.

FIG. 1 depicts an accumulator ramp 40 which is fixed relative to the conveyor tray 12. The accumulator ramp includes an incled ramp floor 46 having a lower end which mates with the tray floor 14 and an upper end vertically spaced above the lower end. The accumulator ramp also includes ramp sides 48, 49 on opposing sides of the ramp floor for temporarily accumulating goods on the ramp floor. The ramp floor 46 and the ramp sides 48 and 49 are thus structurally fixed to the conveyor tray 12. The ramp floor 46 is substantially angled with respect to the generally horizontal tray floor 14. The preferred inclination of the ramp floor 46 will depend upon the type of goods being conveyed, the length of the conveyor 12, and also on the drive mechanism for powering the conveyor tray 12. For applications wherein the conveyor is a linear motion conveyor, the ramp floor 46 will typically be angled at from 15 degrees to 30 degrees. When the accumulator ramp is used with a vibratory conveyor, the ramp floor 46 may have a greater inclination, and typically may be angled at from 20 degrees to 35 degrees relative to the ramp floor. The ramp floor 46 in the depicted embodiment of the invention lies substantially within a single plane 44 which is thus inclined at a selected angle relative to the plane 42 of the tray floor 14. In other embodiments, the ramp floor does not lie within a single plane, and instead may comprise a series of interconnected plates each angled at a greater inclination than the preceding plate with respect to the plane 42. For example, a first plate of the ramp floor which is secured to the tray floor 14 may be angled at 10 degrees relative to the plane 42, a second plate secured to the end of the first plate may be angled at 15 degrees relative to the plane 42, a third plate secured to the end of the second plate may be angled at 20 degrees relative to the plane 42, etc. Also, those skilled in the art will appreciate that the ramp floor 46 may reside within a continuously curved plane, with the lower end connected to the ramp floor 14 and the upper end positioned above the lower end.

The conveyor system 10 as shown in FIG. 1 includes a conventional slide gate 52 which is commonly in the opened position to allow goods to pass through the opening 54 and to the downstream conveyor DC. The opening 54 may be provided at any convenient location, and is shown in the lowermost end of the ramp 46. The opening 54 could be provided, however, in the tray floor 14 at a position immediately upstream from the ramp floor 46.

The slide gate 52 is interconnected with a bracket 56 which is pivotally connected to the rod end of an actuator 58, which may be a hydraulic or pneumatically powered cylinder. The cylinder end of the actuator 58 is pivotally supported at an upper end of the accumulator ramp 40 by the bracket 57. When the actuator 58 is in its retracted position, gate 52 is open and material discharges through the opening 54, as shown in FIG. 1. If the operation of a downstream conveyor DC is interrupted, the powered actuator 58 may be automatically energized to close the gate 52, thus prohibiting the discharge of goods through the opening 54 and causing the goods to move up the ramp floor 46. A control mechanism may be used for automatically closing the gate 52 if the normal operation of the downstream conveyor DC is interrupted for a period of, for example, longer than ten seconds.

When the gate 52 closes, goods moving along the conveyor tray 12 will move up the ramp floor 46, thereby creating a back pressure which will slowly and gradually increase the depth of the goods along the conveyor tray 12. The goods will thus accumulate both within the accumulator 40 and within the conveyor tray 12, with the accumulation within the conveyor tray 12 starting at the downstream or discharge end of the conveyor tray, and slowly working backward toward the upstream end of the conveyor. A depth sensor 98 may be provided spaced along the accumulator ramp 40 or along the conveyor tray 12 for detecting the depth of goods on the conveyor tray. When the depth of the goods rises to a selected level, the control mechanism 36, which may include a conventional computer, may act upon the drive mechanism 24 for slowing down the travel rate of the goods along the conveyor tray, thereby resulting in the goods fed from the upstream conveyor UC stacking up more deeply in the upstream portion of the conveyor 12.

As goods are moved up the ramp floor 46, gravity provides an increased back pressure which gently compacts the product along the conveyor system and thus allows more product to accumulate on the conveyor system. By slowing down the travel speed of goods moving along the conveyor 12, the incoming product accumulates in an upstream portion of the conveyor and reduces the back pressure to prevent undue product breakage.

A position sensor 99 may also be provided for detecting the position of goods along the ramp floor. If goods are pushed up the ramp floor to a selected position, the control mechanism 36 automatically may temporarily discontinue operation of the drive mechanism 24. Before goods on the conveyor system 10 are damaged to an unacceptable level, the entire operation of the conveyor system 10 may thus be discontinued, and an accumulator associated with the upstream conveyor UC may then be activated for prohibiting the further discharge of goods onto the conveyor system 10. In a similar manner, each conveyor in a linear series of conveyors may be actively controlled to provide a very large accumulator system.

When operation of the downstream conveyor DC has resumed, the actuator 58 may be automatically activated for opening the gate 52 and thus discharging goods through the opening 54. Initially, goods may thus pass along the conveyor 12 in a conventional manner to the opening 54, while simultaneously goods slide down the ramp floor 46 to the opening 54. Within a relatively short period of time, all the goods stored in the accumulator 40 will be discharged through the opening 54, and the conveyor system 10 will then assume its normal operation.

In order to accommodate a substantial quantity of accumulated goods on the conveyor system 10 while the gate 52 is closed, the height of the sides 16, 18 of the conveyor 12 and the height of the ramp sides 48, 50 may be increased compared to conveyor sides which do not include the accumulator system to store a desired quantity of accumulated goods.

Figure 3:
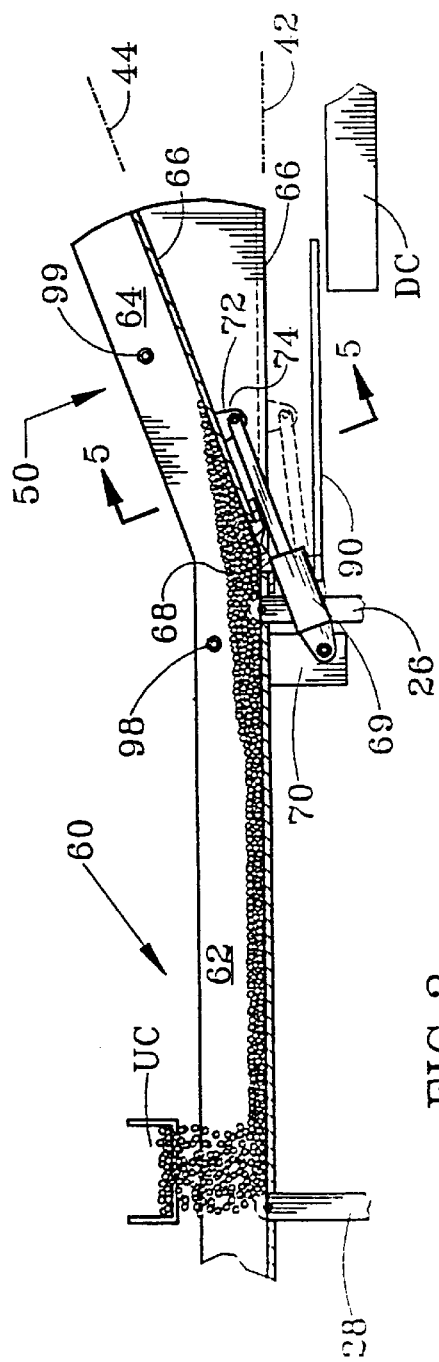
FIG. 3 is a side view, partially in cross-section, of another embodiment of a conveyor system according to the present invention. The accumulator ramp is shown in cross-section with the ramp floor inclined, and is shown in dashed lines with the ramp floor in the conveyor transport position.

FIG. 3 illustrates another embodiment of the invention, wherein the conveyor system 60 includes a conveyor tray 62 as disclosed above. Various components of the conveyor 60 are not shown in FIG. 3 for better illustration of the depicted components. It should be understood that the conveyor system 60 may otherwise include the components discussed above.

In the FIG. 3 embodiment, the accumulator ramp includes a ramp floor 66 which is pivotally connected at 68 to the tray floor. The accumulator ramp includes ramp sides 64 and 65 on opposing lateral sides of the ramp floor, with each of the sides 64, 65 being fixed to the conveyor tray 62. A powered ramp actuator 69 may be pivotally supported from bracket 70 which is secured to the conveyor tray 62. The rod end of the actuator 69 pivotally connected at 74 to a ramp floor bracket 72, which in turn is fixedly secured to the ramp floor 66. Accordingly, the actuator 69 may be retracted so that the ramp floor is positioned substantially in line with the plane 42 of the supporting surface on the tray, but may also be extended so that the ramp floor 66 is inclined to the position shown in FIG. 3. The ramp floor 66 may thus be raised when the operation of the downstream conveyor DC is interrupted, thereby causing the product to move up the inclined ramp surface and beginning the accumulation. The hydraulic or pneumatic cylinder 69 may be replaced with any other type of powered actuator, such as a rotary actuator mounted on the hinge or the ramp floor.

An advantage of the embodiment shown in FIG. 3 is that the accumulator system provides a first-in/first-out discharge of goods. Goods which thus first enter the accumulator system 50 are the first goods which are discharged from the accumulator system. This first-in/first-out feature has significant benefits when the transported products have a relatively short life.

Figure 4:
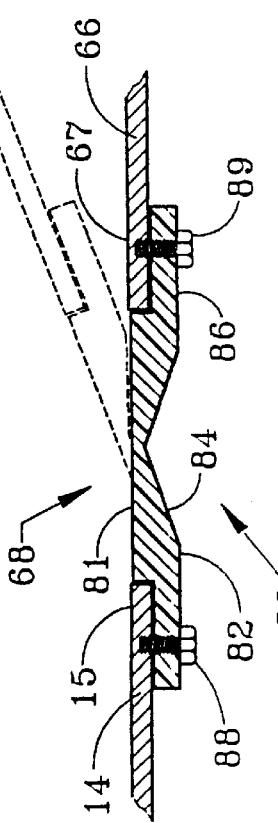
FIG. 4 is a cross-sectional view illustrating the hinged connection between the conveyor tray and the ramp floor as generally shown in FIG. 3. The accumulator floor is shown in the conveyor transport position in solid lines, and in the accumulator position in dashed lines.

FIG. 4 depicts a preferred hinge mechanism 80 for interconnecting the conveyor floor 14 with the ramp floor 66. The hinge mechanism 80 may be referred to as a "living hinge" which is conventionally manufactured from a plastic material. The upstream end 82 of the hinge is secured by a conventional securing member, such as cap screws 88, to the tray floor 14. The opposing downstream end 86 is similarly secured by a plurality of cap screws 89 to the ramp floor 66. A central portion of the hinge 80 may include one or more v-shaped notches 84 for providing the desired pivoting action for the hinge. The hinge 80 is sufficiently rigid so that cyclical movement of the conveyor floor 16 is translated to corresponding movement of the ramp floor 66. The hinge is thus configured so that, when the accumulator floor is in its conveyor transport position, a substantially continuous upper surface for supporting the goods is provided by the upper surface 15 of the conveyor floor 14, the upper surface 81 of the hinge 80, and the upper surface 67 of the ramp floor 66. Preferably the securing members 88 and 89 do not extend upward through the upper surface of the conveyor floor 14 or the ramp floor 66.

In another embodiment, a conventional concentric or piano-type hinge with a close tolerance fit may be used to interconnect the conveyor floor with the ramp floor. An advantage of the concentric hinge embodiment is that the ramp floor 66 may be easily disassembled from the conveyor floor 14 for easy cleaning.

Figure 5:
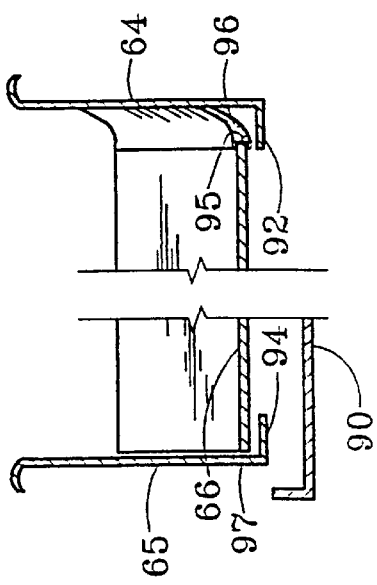
FIG. 5 is a cross-sectional view along 5—5 in FIG. 3, illustrating on the right side a lip seal between the ramp floor and the right side of the ramp, and on the left side a close fit between an edge of the ramp floor and the left side of the ramp.

Depending on the application, a tight seal between the edge of the accumulator floor and the sides of the accumulator may not be required. FIG. 5 thus depicts the edge 97 of the floor 66 as being spaced very close to the conveyor side 65. Some small materials, such as seasoning, may fall through a gap between these components, and accordingly a catch pan 90 may be provided under the accumulator ramp for catching these fine particles.

A tight seal may be provided between each edge of the floor 66 and a ramp side by providing a lip seal 96 shown in FIG. 5 for sealing between the edge 95 of the ramp floor 66. The end of the lip seal 96 may thus slidably engage the ramp side 64 as the ramp floor pivots between the accumulator position and the conveyor transport position. If desired, a stop flange 92, 94 at the lower end of each side 64, 65 may act as a stop to limit downward movement of the pivotal ramp floor 66.

According to the method of the invention, when the operation of downstream conveyor DC is interrupted, actuator 68 may be automatically activated to raise the ramp floor 66 to an inclined position, thereby causing goods to accumulate along the conveyor system. As with the previous embodiment, the accumulated goods are stored in the FIG. 3 embodiment on both the accumulator system 50, and also on the conveyor tray 62. The conveyor as shown in FIG. 3 may also be provided with the sensors 98 and 99 as previously described, so that the travel speed of goods along the conveyor may first be slowed down and the conveyor operation interrupted if the product travels up the inclined ramp 66 to a selected level. When operation of the downstream conveyor is resumed, the ramp 66 may be lowered and actuation of the conveyor system 60 resumed, thereby discharging goods from the end of the conveyor.

Various modifications to the conveyor and to the accumulator system and to the techniques described herein should be apparent from the above description of the preferred embodiments. Although the invention has thus been described in detail for these embodiments, it should be understood that this explanation is for illustration, and the invention is not limited to these embodiments. Equipment and operating techniques will thus be apparent to those skilled in the art in view of this disclosure. Further modifications are thus contemplated and may be made without departing from the spirit of the invention, which is defined by the following claims.

What is claimed is:

1. A conveyor system for transporting goods from upstream equipment to downstream equipment and for temporarily storing goods when the operation of the downstream equipment is temporarily interrupted, the conveyor system comprising:

a conveyor tray having a substantially horizontal tray floor for supporting the goods thereon and tray sides on opposing sides of the floor;

a drive mechanism cyclically acting on the conveyor tray for moving goods along the tray floor;

an accumulator ramp for temporarily storing goods, the accumulator ramp having a ramp floor with a lower end mating with the tray floor and an upper end normally vertically spaced above the lower end, such that goods moving along the conveyor tray may either be pushed up the accumulator ramp or allowed to pass to downstream equipment unimpeded, the accumulator ramp being secured to the conveyor tray to cyclically move with the conveyor tray in response to the drive mechanism; and the accumulator ramp having ramp sides on opposing sides of the ramp floor for temporarily accumulating goods on the ramp floor.

2. The conveyor system as defined in claim 1, wherein:

the ramp floor is pivotally connected to the conveyor tray and is selectively movable from a conveyor transport position wherein the ramp floor is substantially within a plane of the tray floor for discharging goods to the downstream equipment to an accumulator position wherein the ramp floor is substantially angled with respect to the tray floor and the upper end of the ramp floor is spaced vertically above the lower end of the ramp floor.

3. The conveyor system as defined in claim 2, further comprising:

a powered ramp actuator for selectively positioning the ramp floor from the conveyor transport position to the accumulator position.

4. The conveyor system as defined in claim 2, wherein the ramp sides are fixed to the conveyor tray, such that the ramp floor pivots with respect to the ramp sides.

5. The conveyor system as defined in claim 4, further comprising:

a lip seal for sealing between an edge of the ramp floor and one of the ramp sides.

6. The conveyor system as defined in claim 4, further comprising:

a catch pan positioned beneath the accumulator ramp for catching material passing between an edge of the ramp floor and one of the ramp sides.

7. The conveyor system as defined in claim 1, further comprising:

a gate normally opened to discharge goods from the conveyor tray, the gate when closed causing goods to move up the accumulator ramp.

8. The conveyor system as defined in claim 7, further comprising:

a powered gate actuator for selectively moving the gate between its opened and closed positions.

9. The conveyor system as defined in claim 1, further comprising:

a depth sensor for detecting the depth of goods on the conveyor tray; and a control mechanism for acting on the drive mechanism to slow down the travel rate of goods along the conveyor tray in response to the depth sensor.

10. The conveyor system as defined in claim 9, further comprising:

a position sensor for detecting the position of goods along the ramp floor; and a control mechanism temporarily discontinuing operation of the drive mechanism in response to the position sensor.

11. An accumulator system for temporarily storing goods from a conveyor when the operation of downstream equipment is temporarily interrupted, the conveyor including a conveyor tray having a substantially horizontal tray floor for supporting the goods thereon, tray sides on opposing sides of the tray floor, and a drive mechanism cyclically acting on the conveyor tray for moving goods along the tray floor, the accumulator system comprising:

an accumulator ramp for temporarily storing goods, the accumulator ramp having a ramp floor with a lower end mating with the tray floor and an upper end normally vertically spaced above the lower end, such that goods moving along the conveyor tray may either be pushed up the accumulator ramp or allowed to pass downstream equipment unimpeded, the accumulator ramp being secured to the conveyor tray to cyclically move with the conveyor tray in response to the drive mechanism; and the accumulator ramp having ramp sides on opposing sides of the ramp floor for temporarily accumulating goods on the ramp floor.

12. The accumulator system as defined in claim 11, further comprising:

the ramp floor is pivotally connected to the conveyor tray and is selectively movable from a conveyor transport position wherein the ramp floor is substantially within a plane of the tray floor for discharging goods to the downstream equipment to an accumulator position wherein the ramp floor is substantially angled with respect to the tray floor and the upper end of the ramp floor is spaced vertically above the lower end of the ramp floor; and a powered ramp actuator for selectively positioning the ramp floor from the conveyor transport position to the accumulator position.

13. The accumulator system as defined in claim 12, wherein the ramp sides are fixed to the conveyor tray, such that the ramp floor pivots with respect to the ramp sides.

14. The accumulator system as defined in claim 11, further comprising:

a gate normally opened to discharge goods from the conveyor tray, the gate when closed causing goods to move up the accumulator ramp; and a powered gate actuator for selectively moving the gate between its opened and closed positions.

15. The accumulator system as defined in claim 11, further comprising:

a depth sensor for detecting the depth of goods on the conveyor tray;

a control mechanism for acting on the drive mechanism to slow down the travel rate of goods along the conveyor tray in response to the depth sensor;

a position sensor for detecting the position of goods along the ramp floor; and a control mechanism temporarily discontinuing operation of the drive mechanism in response to the position sensor.

16. A method of transporting goods from upstream equipment to downstream equipment and temporarily storing goods when the operation of downstream equipment is temporarily interrupted, the method comprising:

providing a conveyor tray having a substantially horizontal tray floor for supporting the goods thereon and tray sides on opposing sides of the tray floor;

providing an accumulator ramp for temporarily storing goods, the accumulator ramp having a ramp floor with a lower end mating with the tray floor and an upper end normally vertically spaced above the lower end, the accumulator ramp having ramp sides on opposing sides of the ramp floor for temporarily accumulating goods on the ramp floor;

cyclically powering a conveyor tray to move goods along the tray floor; and moving goods along the conveyor tray while the accumulator ramp cyclically moves with the conveyor tray so that goods may either be pushed up the accumulator ramp or be allowed to pass to a downstream conveyor unimpeded.

17. The method as defined in claim 16, further comprising:

pivotally connecting the ramp floor to the conveyor tray, and selectively moving the ramp floor from a conveyor transport position, wherein the ramp floor is substantially within a plane of the tray floor for discharging goods to the downstream equipment, to an accumulator position, wherein the ramp floor is substantially angled with respect to the tray floor and the upper end of the ramp floor is spaced vertically above the lower end of the ramp floor.

18. The method as defined in claim 17, further comprising:

powering a ramp actuator to selectively position the ramp floor from the conveyor transport position to the accumulator position.

19. The method as defined in claim 16, further comprising:

opening a gate to discharge goods from the conveyor tray; and closing the gate to move the goods up the accumulator ramp.

20. The method as defined in claim 16, further comprising:

detecting the depth of goods on the conveyor tray; and slowing down the travel rate of goods along the conveyor tray in response to the sensed depth of the goods.

* * * * *